Patented May 13, 1947

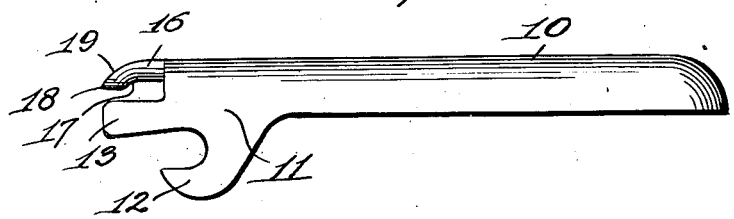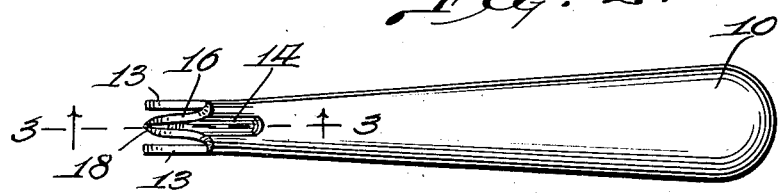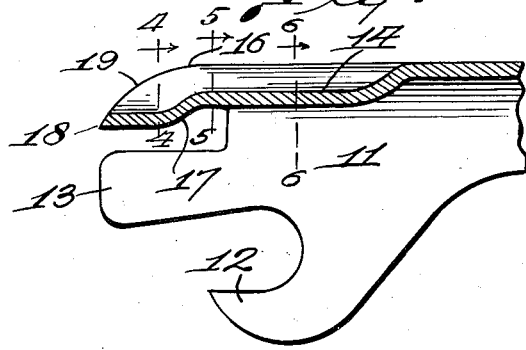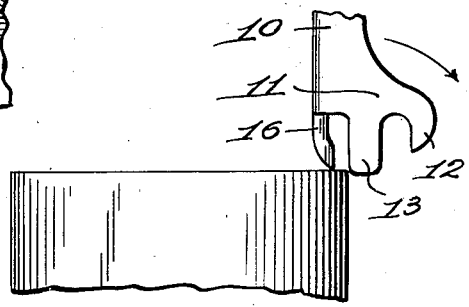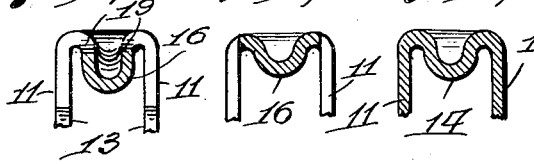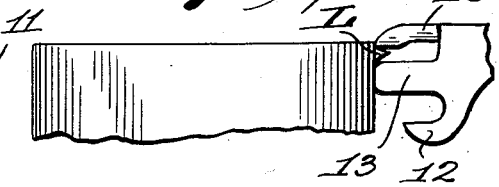
INVENTOR.
EMIL A. SCHIGUT.
BY
ATTY.

2,420,402

UNITED STATES PATENT OFFICE 2,420,402

CAN PUNCTURING AND SPOUT FORMING DEVICE

Emil A. Schigut, Los Angeles, Calif.

Application February 7, 1944, Serial No. 521,306

1 Claim. (Cl. 7—14.2)

My invention relates to a can puncturing device and has for its principal object, to provide a simple, practical and inexpensive one piece implement, which may be advantageously employed for puncturing metal cans and at the same time forming a small pouring lip or spout on the edge of the can, immediately adjacent the puncture.

My improved implement is particularly designed for use on cans containing liquids such as condensed or evaporated milk, thin soups, fruit and vegetable juices and the like.

A further object of my improved invention is, to provide an implement of the character referred to, having hooks which are effective in the removal of bottle caps.

With the foregoing and other objects in view, my invention consists in certain novel features of construction and arrangement of parts which will be hereinafter more fully described and claimed and illustrated in the accompanying drawings in which:

Fig. 1 is a side elevational view of the implement.

Fig. 2 is a plan view.

Fig. 3 is an enlarged detail section taken on the line 3—3 of Fig. 2.

Fig. 4 is a cross section taken on the line 4—4 of Fig. 3.

Fig. 5 is a cross section taken on the line 5—5 of Fig. 3.

Fig. 6 is a cross section taken on the line 6—6 of Fig. 3.

Fig. 7 is an elevational view showing the implement in position to puncture a can.

Fig. 8 is an elevational view, showing the implement in position after the pouring lip forming operation.

Referring by numerals to the accompanying drawings which illustrate a preferred embodiment of my invention, 10 designates the handle of the implement, which is pressed from metal into inverted channel shape and depending from the forward portion of said handle are parallel side walls 11.

Depending from walls 11 are forwardly presented hooks 12 adaptable for use in removing bottle caps.

Projecting forwardly from walls 11 above hooks 12 are parallel fingers 13, the forward ends of which are adapted to bear on the wall of the can when the implement is manipulated to form a pouring lip or spout.

The metal in the top of the front portion of the handle is pressed downward to form a short longitudinally disposed U-shaped rib 14, and projecting forwardly from said rib is a prong 16 which is U-shape in cross section as illustrated in Figs. 4, 5 and 6.

The forward portion of prong 16 is pressed downward so that it occupies a plane slightly below that occupied by the rear portion, and thus an inclined shoulder 17 is formed between the front and rear ends of said prong.

The side portions of the material in the prong 16 forwardly of the shoulder 17 are inclined toward each other and thus the prong terminates in a sharp point 18 with rearwardly extending curved upper edges 19.

To use the implement, same is held in a vertical position with the point of the prong bearing on the top of the can and the ends of fingers bearing on the corner of the can, as seen in Fig. 7.

The implement is now forced downward so as to drive the prong through the top of the can, and at the same time, the implement is swung from a vertical to a horizontal position as seen in Fig. 8 and, by so doing the wall of the can immediately adjacent the puncture will be pressed outward and downward to form a short outwardly presented pouring lip or spout L.

During the swinging movement of the implement as just described, the ends of the fingers 13 fulcrum on the wall of the can just below the top thereof.

Thus, in a single operation the can is punctured and a pouring lip formed immediately adjacent the pouring opening. The shoulder 17 and lowered forward portion of the prong 16 afford simple and effective means for pressing and "ironing" out the metal in the wall of the can to form the pouring lip.

Thus it will be seen that I have provided a can puncturing tool which is simple in structure, inexpensive of manufacture and very effective in performing the functions for which it is intended.

It will be understood that minor change in the size, form and construction of the various parts of my improved can puncturing device may be made and substituted for those herein shown and described without departing from the spirit of the invention, the scope of which is set forth in the appended claim.

I claim as my invention:

A can puncturing and spout forming device formed from a single piece of material comprising a handle U-shaped in cross section, a pair of parallel walls at the operative end of said handle, a prong U-shaped in cross section with the legs of said U-shape projecting from the web of and in prolongation of the handle at the operative end of said handle, the U-shape of said prong being inverted with respect to the U-shape of the handle, said prong having a pointed end, a pair of fingers projecting from the side walls in prolongation of said handle, said fingers being parallel to and spaced below the web of said prong to admit the side wall of a can between said prong and fingers, said prong near its pointed end being curved toward the said finger, said end being closer to said fingers than the rest of the prong, and said fingers having ends which terminate in the vertical plane as the pointed end of said prong.

EMIL A. SCHIGUT.

REFERENCES CITED

The following references are of record in the file of this patent:

UNITED STATES PATENTS

| Number | Name | Date |
|---|---|---|
| 69,111 | McGill | Sept. 24, 1867 |
| 1,288,419 | Tkemori | Dec. 17, 1918 |
| 2,025,103 | Haudenschild | Dec. 24, 1935 |
| 2,218,437 | Punte | Oct. 15, 1940 |
| 2,243,511 | Sowers | May 27, 1941 |
| 1,351,646 | Higgs | Aug. 31, 1920 |
| 637,048 | Toulotte | Nov. 14, 1899 |
| 1,490,149 | Vaughan | Apr. 15, 1924 |